United States Patent [19]
Edmond

[11] 4,099,409
[45] Jul. 11, 1978

[54] MULTI-AXIS LOAD CELL WITH ARCUATE FLEXURES

[75] Inventor: James Junior Edmond, Southfield, Mich.

[73] Assignee: The Bendix Corporation, Southfield, Mich.

[21] Appl. No.: 812,966

[22] Filed: Jul. 5, 1977

[51] Int. Cl.² .............................................. G01L 5/16
[52] U.S. Cl. ................................................. 73/133 R
[58] Field of Search .............................. 73/133 R, 517

[56] References Cited

U.S. PATENT DOCUMENTS

| | | | |
|---|---|---|---|
| 3,879,995 | 4/1975 | Libertiny | 73/133 R |
| 3,939,704 | 2/1976 | Zipin | 73/133 R |
| 4,023,404 | 5/1977 | Brendel | 73/133 R |

FOREIGN PATENT DOCUMENTS

| | | | |
|---|---|---|---|
| 1,220,022 | 1/1971 | United Kingdom | 73/133 R |

Primary Examiner—Charles A. Ruehl
Attorney, Agent, or Firm—Kenneth A. Seaman; Raymond J. Eifler

[57] ABSTRACT

A load cell for measuring forces and moments in three orthogonal directions. The load cell has a central hub (101) and an exterior housing (110) with a plurality of arcuate flexure segments (141, 142, 143) coupled between the hub (101) and the housing (110), for receiving forces and moments applied to one and transmitting them to the other. Two sets of electrical displacement transducers, one set (121, 122, 123) arranged in pinwheel fashion about an axis of the hub (101), the other set (131, 132, 133) parallel to the axis, measure the three angular and the three translational displacements of the hub. The three angular displacements and the three translational displacements are algebraically related to the forces and moments applied to the hub.

12 Claims, 9 Drawing Figures

FIG. 4
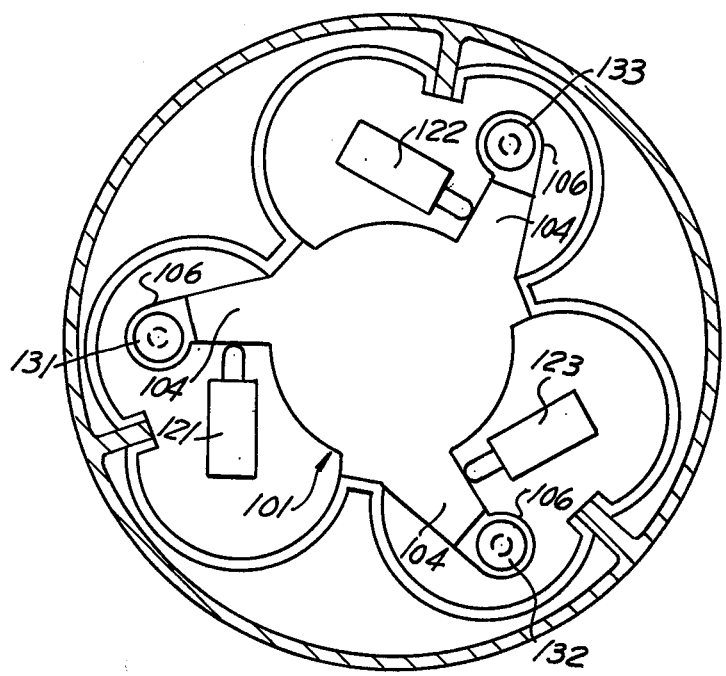
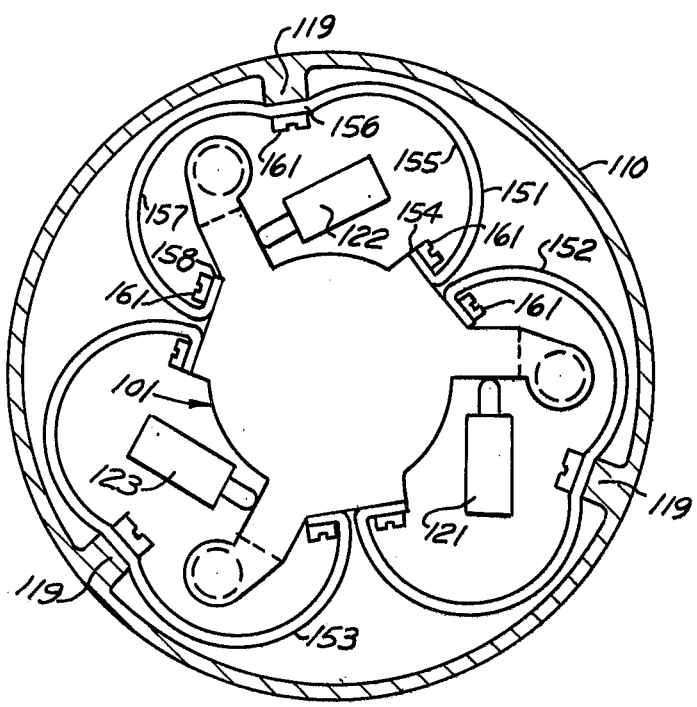
FIG. 5

MULTI-AXIS LOAD CELL WITH ARCUATE FLEXURES

CROSS-REFERENCE TO RELATED APPLICATIONS

C. F. Ruoff, Jr., and J. L. Henry "Multi-Axis Load Cell," U.S. application Ser. No. 789,032 filed Apr. 20, 1977, as a continuation of Ser. No. 615,852 filed Sept. 23, 1975, which is specifically incorporated herein by reference.

D. M. Espy and J. L. Henry "Reorientation Device for an Object Manipulator," U.S. application Ser. No. 581,326 filed May 27, 1975, which is specifically incorporated herein by reference.

C. F. Ruoff, Jr., "Method and Apparatus for Generating Position or Path Control Programs Using Force Feedback" U.S. application Ser. No. 708,521 filed July 26, 1976, and specifically incorporated by reference.

BACKGROUND OF THE INVENTION

1. Field of Invention.

This invention relates to multi-axis load cells through which vectors representing all components of forces and bending moments (or torques) applied thereon may be measured. In particular, the present invention is directed to novel structures for connecting a load cell hub and its housing to allow relative motion therebetween.

2. Description of the prior art.

A load cell is a device for measuring and resolving forces and moments applied thereon into their orthogonal components. This may be accomplished by connecting spring elements to the loaded input and measuring the displacements (angular and translational) as a measure of forces and moments.

Many load cells have been suggested in the prior art. One such load cell is disclosed in Ser. No. 789,032 filed Apr. 20, 1977 (as a continuation of Ser. No. 615,852 filed Sept. 23, 1975.) This application discloses a load cell having a plurality of radially extending flexure arms extending from the hub and flexure beams mounted transverse to the flexure arms for mounting the flexure arms to the housing. While such a load cell is generally adequate for measuring, this load cell has the undesirable characteristics a rather limited range of maximum motions and a rather low maximum force level. Furthermore, the fabrication of the parts is rather difficult and expensive, leading to a comparatively expensive load cell.

Another prior art load cell is disclosed in U.S. Pat. No. 2,782,736 to Peucker. This load cell has the disadvantage of not measuring both forces and moments in each of the three orthogonal directions. This load cell is also limited in that there is a relatively large amount of cross talk, that is, forces or moments in one direction inducing an erroneous reading in a perpendicular direction.

A Master's Thesis entitled "Force Feedback Steering of a TeleOperator System" by R. C. Groome, Jr., MIT Draper Laboratory Report T-575, August, 1972, discloses a prior art load cell with cantilever beams which slide and bend in response to loads. The disclosed system uses a strain gage to measure loads. This load cell has disadvantages in the sliding beams (which introduce error in the reading) and in the use of strain gages (which have a limited linear or operating range of forces).

Other prior art load cells have been suggested. Among these are U.S. Pat. No. 3,939,704; 3,780,573; 3,272,006; 3,309,922; and 3,377,849. These patents typically lack the ease in manufacturing and assembly or the accuracy necessary to provide an inexpensive but accurate load cell. Typically, the sensors in the various degrees of freedom are not independent but have a high degree of cross-talk or undesired co-dependence.

Some load cells have a resonant frequency at a low-frequency (under 20 hertz). This is an undesirable feature in a load cell of the present type.

Many prior art devices (such as U.S. Pat. No. 3,939,704) use an excess of force-measuring devices, often eight and sometimes more. While this allows for some ease in calculations of forces and moments, it also adds expense needlessly to the cost of materials and the cost of fabrication.

Therefore, it is an object of the present invention to provide a load cell with uniform load characteristics, with a larger range of maximum motions, and yet easy and inexpensive to fabricate.

SUMMARY OF INVENTION

The present invention overcomes the foregoing and other limitations of the prior art load cells by providing a load cell which allows greater relative movement between hub and housing in all directions while providing a system which is easy and cheap to fabricate. Further, the present load cell had a good linear response over its wider operating range and a relatively low hysteresis. The spring rate is relatively uniform on radial deflection while providing a very low cross talk between the independent orthogonal directions. Furthermore, the load cell does not have a natural or resonant frequency in response to low frequency (under 20 hertz) input signals.

The load cell of the present invention is characterized by a plurality of arcuate flexures 141, 142, 143, preferably shaped in the form of semi-circles, which are mounted between hub 101 and housing 110 at equally spaced locations about the periphery of the housing. In its preferred embodiment, the load cell has three twin-lobed arcuate segments made of high-carbon, hardened and tempered spring steel. Each segment is mounted to the outer housing at its end portions and medially to the inner hub. Movement of the hub is sensed by two sets of electrical displacement transducers, one of which sets has transducers 121, 122, 123 arranged in pin wheel fashion about a load cell axis in a plane bisecting the flexures and transverse to the axis, the other of which sets has axially-extending transducers 131, 132, 133 engaging a flange portion of the hub in the same plane. The transducers in the two sets measure the axial and radial displacements of the hub directly and engage the hub in substantially a common plane to reduce cross talk between the transducers.

These and other objects and advantages of the present invention will become apparent from the following detailed description of the drawings, taken in conjunction with the appended claims.

BRIEF DESCRIPTION OF THE DRAWINGS

FIG. 4 is a cross sectional view of the load cell as seen from the line IV—IV in FIG. 3.

FIG. 5 shows an alternate embodiment of the load cell of the present invention, taken generally looking from the line II—II in FIG. 3. This view corresponds substantially to FIG. 2, with a different arrangement of the flexures.

DETAILED DESCRIPTION OF THE DRAWINGS

Figure 1:
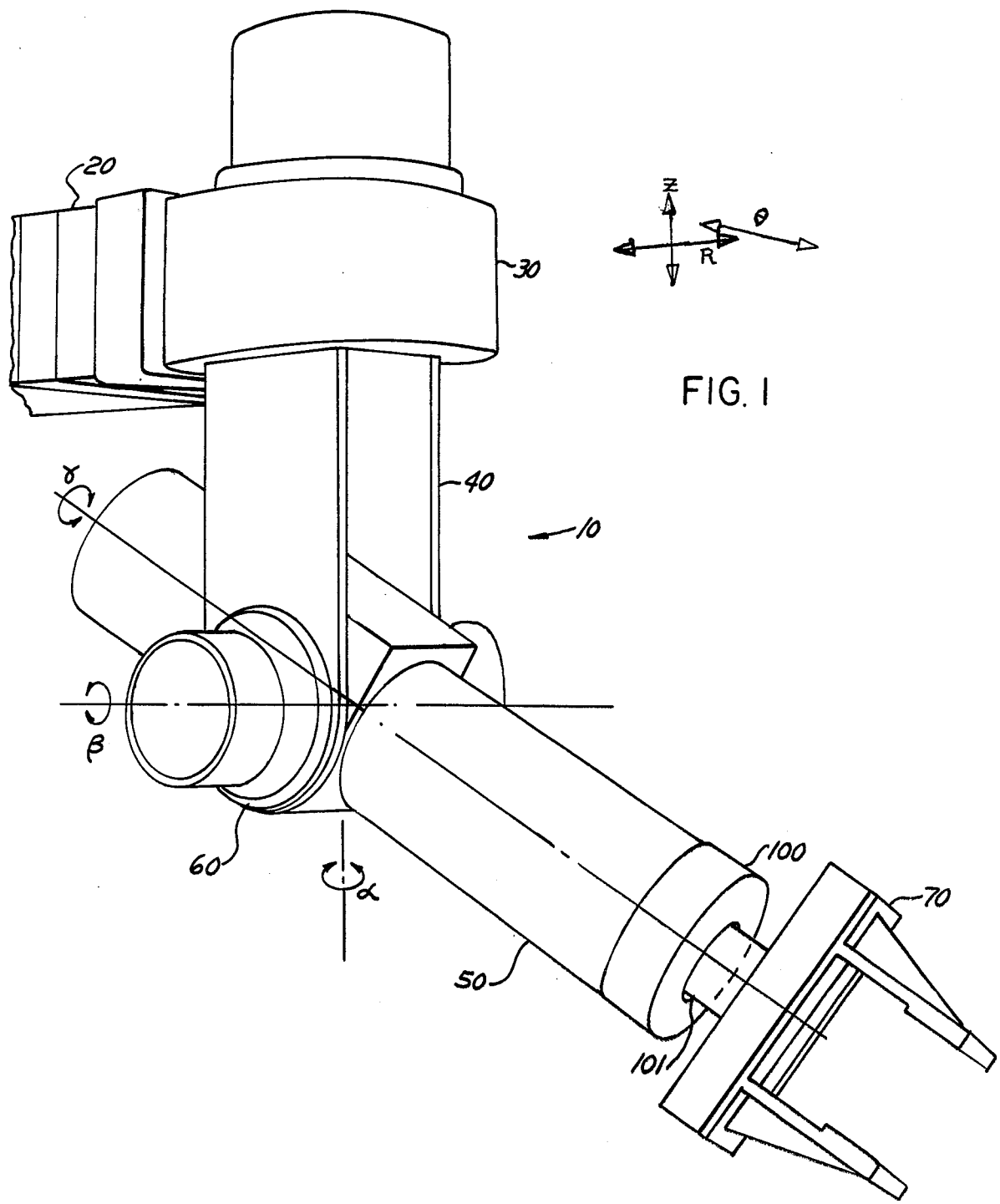
FIG. 1 shows the load cell of the present invention in one of its environments as a wrist force sensor on a moveable mechanical arm.

Referring now to FIG. 1, a robot arm assembly 10 is shown generally. The assembly 10 consists of an inner radial arm 20 and a rotational mounting 30 for the outer arm assembly. An upper yoke 40 is mounted to the rotational joint 30. A forearm 50 is mounted to the upper yoke 40 via a rotational joint 60. A gripper assembly 70 is mounted to the forearm 50 with load cell 100 mounted therebetween. The gripper assembly 70 is mounted to a shaft 101, a portion of which extends into the load cell and forms the hub thereof.

The arm 10 has a plurality of rotational and translational degrees of freedom (shown by arrows and labelled Z, R, $\theta$, $\alpha$, B, $\gamma$) which are of peripheral importance only. These are further described, as is the gripper arm in applications, Ser. Nos. 581,326 and 708,521, which are owned by the asignee of the present invention. These applications are incorporated by reference herein to provide a fuller understanding of the background of this invention.

Figure 2:
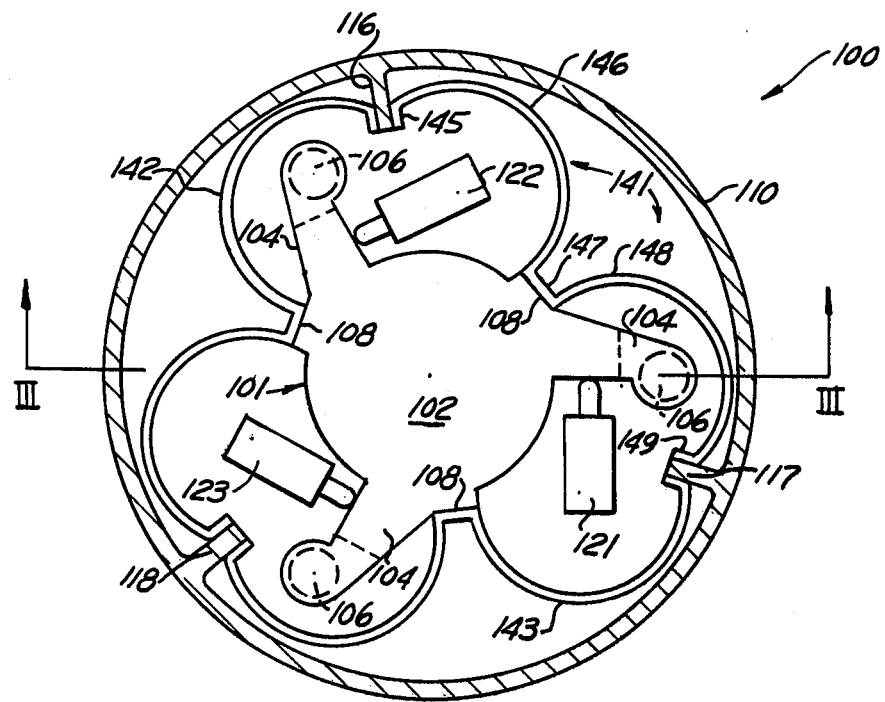
FIG. 2 is a cross sectional view of the interior of the load cell, as seen from the line II—II in FIG. 3.

FIG. 2 shows in detail the interior structure of the load cell 100. The load cell consists generally of a hub 101, a housing 110, a first set of transducers 121, 122, 123 and a flexure system 141, 142, 143.

The hub 101 is mounted to the housing 110 by the flexures 141, 142, 143. The transducers 121, 122, 123 are mounted to the housing with fixed connections which are not shown in this application but which are shown and described in copending Ser. No. 789,032, which is hereby incorporated by reference. The transducers 121, 122, 123 are disposed in pinwheel fashion about a central axis of the hub 101 and engage a portion of the hub 101 to measure movement thereof in the plane of the FIG. 2.

The hub 101 consists of a central portion 102 which is generally cylindrical in shape, the axis of which is referred to as the axis of the load cell or of the hub. The hub 101 has outwardly extending arms 104, each of which terminate in an enlarged end portion having a lower surface 106, which surface is preferably circular. The surfaces on all end portions are preferably coplanar. The hub 101 has a plurality of mounting seats 108 for receiving mounting screws or other fixing element to mount one of the flexures 141, 142, 143 thereto.

The housing 110 includes a base portion and a cover portion (both of which are not shown in FIG. 2) and three attachment posts or ribs 116, 117, 118. The three ribs extend radially inward a short distance from the housing 110 and provide attachment locations for the three flexures 141, 142, 143. The ribs are generally of a narrow width and a short length and are spaced about the periphery of the housing 110 at 120° intervals for the preferred embodiment having three flexures.

The flexure 141 is representative of the three flexures 141, 142, 143 and will be described in some detail, it being understood that the other flexures are preferably of similar construction. The flexure 141 has two end portions (145 and 149) which are bent to provide a flat seating surface for mounting or coupling to the attachment posts or ribs to which the flexure 141 is to be mounted at its ends. The flexure 141 is mounted at the end portion 145 to the post 116 and at the end 149 to the post 117. The flexures are shown in greater detail in FIG. 6 (and the detailed description thereof). There one type of flexure is shown in perspective to more advantageously show a detailed structure for attaching the flexure to hub and housing.

The flexure 141 has a medial portion 147 for fixing the flexure 141 to the hub 101 at one of the mounting seats 108 on the hub. Any conventional mounting method might be used for this coupling of the flexure medial portion 147 to the mounting seat 108.

Figure 7:
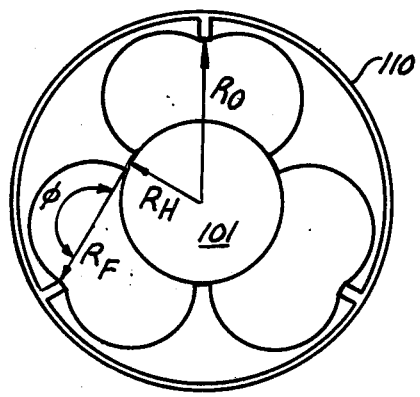
FIGS. 7, 8 and 9 show three configurations relative of the present load cell, with the hub varying in size with respective to the housing, providing variations in stiffness of the load cell.
Figure 8:
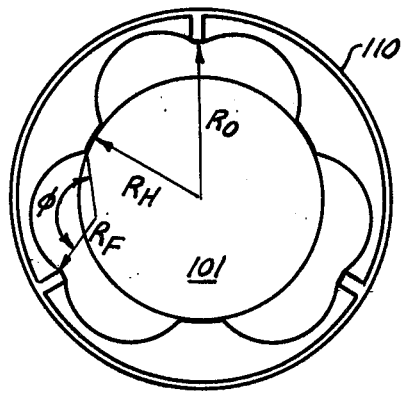
Figure 9:
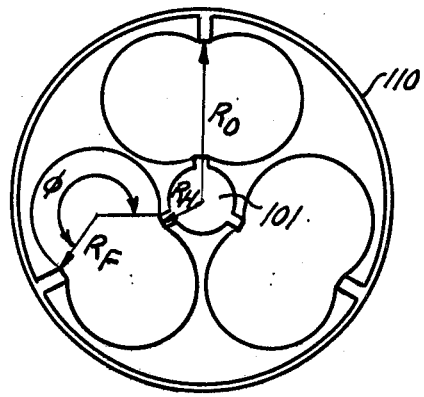

Between the end portion 145 and the medial portion 147 is an arcuate segment 146 which is in the preferred embodiment is of semi-circular shape. A second arcuate portion 148 is located between the medial portion 147 and the end portion 149. The arcuate portion 148 is preferably of semi-circular shape, (as shown in FIG. 7) although other circular portions are possible also (as shown in FIGS. 8 and 9).

Figure 3:
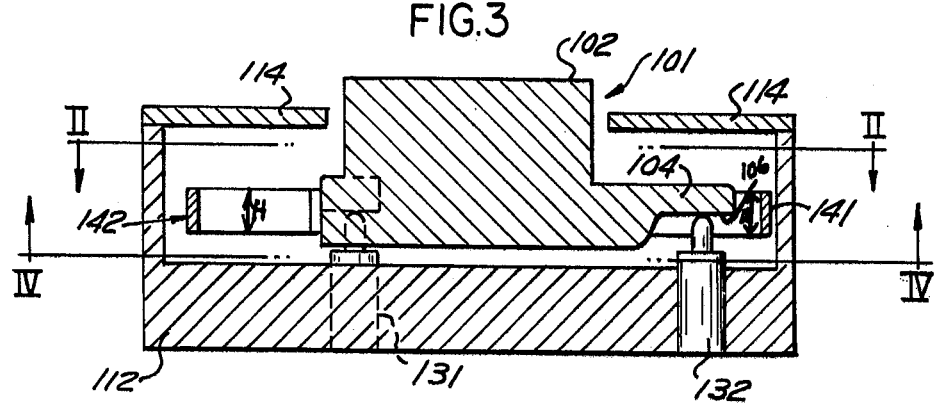
FIG. 3 is an interior view of the load cell, as seen from the line III—III in FIG. 2.

FIG. 3 shows a view of the load cell looking along line III—III of FIG. 2. The central portion 102 of the hub 101 is depicted with one of the outwardly extending arms 104 of the hub. The detail of the housing 110 is shown, with a base 112 and a cover 114 for the housing 110 depicted. The base 112 and the cover 114 protect the interior structure of the load cell, including the transducers and flexures, from external forces and contaminants. Also shown in FIG. 3 are two flexures 141, 142. The third flexure 143 is not visible in this figure.

FIG. 3 also depicts a second set of transducers 131 and 132. A third transducer 133 lies in line with the transducer 131 and is not shown in FIG. 3.

Figure 6:
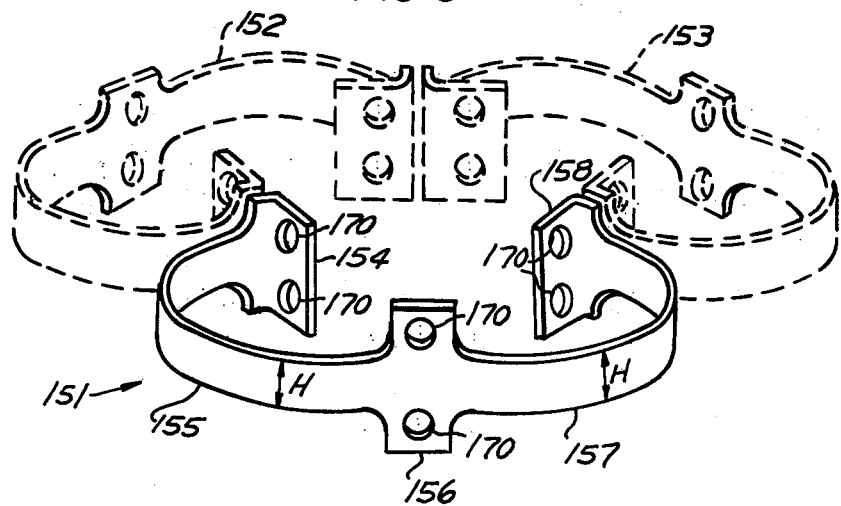
FIG. 6 shows a perspective view of the flexures of FIG. 5.

The flexures 141, 142, 143 have a height H which is relatively uniform throughout the arcuate segments of the flexures, with enlarged portions near the medial and end portions for mounting (see FIG. 6). The plane defined by the surfaces 106 is advantageously a plane which also bisects the height of each flexure, a feature which contributes to the accuracy, uniformity and lack of transducer crosstalk in the load cell.

FIG. 4 is a cross sectional view of the load cell as seen from the line IV—IV in FIG. 3. This figure shows the second set of transducers 131, 132, 133. The transducers 131, 132, 133 engage the end portions 106 of the arms 104 of the hub 101 in the same plane as the first set of transducers 121, 122, 123. The location of the transducers with all transducers in both first and second sets engaging the hub in a common plane minimizes the effect of cross-talk or undesired signals in a second direction resulting from a loading in a first, unrelated direction.

FIG. 5 illustrates an alternate embodiment of the present invention, with a slightly different form and arrangement of the flexures. As in FIG. 2, a hub 101 is connected to the housing 110 by a plurality of flexures, numbered here as 151, 152, 153. The flexures in this embodiment include end portions 154, 158 and a medial portion 156, with a first arcuate portion 155 located between the end portion 154 and the medial portion 156 and a second arcuate portion 157 located between the medial portion 156 and the end portion 158. In this embodiment, however, the end portions of the flexures are attached to the central hub 101, such as by screws 161. The medial portion 156 is attached to a portion 119 of the housing 110 by screws 161 or other securing devices. Since this method requires approximately the same amount of metal fabrication and assembly effort, the selection of one embodiment (such as FIG. 5) over the other (such as FIG. 2) is primarily one of mere desideratum.

FIG. 6 shows in perspective the arrangement of arcuate flexures of the type shown in FIG. 5, with the hub, housing and transducers removed. The flexure 151, representative of the other flexures 152, 153, has end portions 154, 158 and medial portion 156. An arcuate portion 155 is located between the end portion 154 and the medial portion 156 and a second arcuate portion 157 is located between the medial portion 156 and the other end portion 158.

The end portions 154, 158 and medial portion 156 have a height greater than the height H of the arcuate portions 155, 157, allowing the end and medial portions to extend above and below the arcuate portions.

Holes 170 are drilled in the end and the medial portions in that portion of each end and the medial portions which extend above and below the height of the arcuate portions. Preferably, the two holes 170 in any portion are equidistant from the plane which passes through and bisects the height of the flexure. A line connecting the two holes in any one portion is also preferably perpendicular to the bisecting plane. The location of the holes 170 and the enlarged medial and end portions allow easy insertion of screws (not shown in FIG. 6) for fixing the flexure to the housing and the hub, respectively.

The arcuate portions 155 and 157 are of substantially uniform height and thickness and are each arcs of the same radius circles and each are preferably a semi-circle. The end portions 154, 158 are tapered to the enlarged height at the ends of the arcuate portions and are bent to seat firmly on the hub. The medial portion 156 is bent to seat firmly on the housing or an inwardly-extending portion thereof, such as posts 119 shown in FIG. 5.

For the same housing diameter, flexure cross section (thickness and height dimensions) and flexure radii ($R_F$), the load-cell stiffness and deflection range is affected by the effective flexure length ($R_F \cdot \phi$), and the ratio fo the hub attachment radius ($R_H$) to the outer attachment radius ($R_o$).

In FIG. 7, $\phi \simeq 180°$ and $R_H \simeq R_o/2$. This is the preferred embodiment.

In FIG. 8, $\phi < 180°$ and $R_H > R_o/2$ results in a much "stiffer" load cell with a reduced deflection range.

In FIG. 9, $\phi > 180°$ and $R_H < R_o/2$ results in a much more complaint load cell with a greater deflection range.

As a further alternate embodiment (not shown), the load cell of the present invention could be made with a single flexure having successive arcuate portions between intermediate mounting portions, allowing for a single multi-lobed spring element to be used in place of a plurality of spring elements which have been disclosed as the preferred embodiments. The mounting portions would have to be bent and disposed to allow one mounting portion to be mounted to the hub and the next mounting portion to be mounted to the housing.

The load cell of the present invention has appropriate overload protection of a conventional type (not shown). This may be accomplished through suitable enlargements on the hub which cooperate with mechanical stops mounted on the housing. The mechanical stops prevent the relative movement between the hub and the housing from exceeding a predetermined limit. Such an overload protection prevents damage to the transducers and the flexures (and may restrict the flexure to its linear range of operation).

The flexures which have been disclosed in the present application are preferably made from high carbon spring steel such as 1095 steel. The spring steel is advantageously hardened to a Rockwell hardness of between 40 and 44.

The hardened flexure of the present invention is obtained by fabricating a piece of steel to the desired thickness, width, shape, length and surface finish in its annealed form. In the present embodiment, the central holes are formed first. Then the arcuate sections and end portions are formed and drilled on a appropriate fixture to obtain the precise geometry desired. The flexures are then firmly attached via their mounting holes to another fixture which preserves their geometry during heat-treatment, in which they are heated to an elevated temperature, quenched in a salt solution, reheated to a lower temperature, and then air cooled. In this way, the flexures are hardened and tempered to a high yield strength, maximizing the effective load which the load cell can absorb without losing linearity or repeatability.

While a preferred embodiment of the present invention has been disclosed with some particularity, it will be apparent those skilled in the art that changes may be made to the invention as set forth in the appended claims. In some cases, certain features of the invention may be used to advantage without corresponding use of other features. Thus, other methods of detecting the force and moment applied to the hub might be used, as certainly the transducers which are used in the present description are only one measuring apparatus. Other materials and ways of making the flexures will be apparent to workers in the metalurgy and metal-forming fields, and furthermore, nonmetallic material may also be usable in this application. Accordingly, it is intended that the illustrative and descriptive materials herein are used only to illustrate the principles of the invention and not to limit the scope thereof.

What is claimed is:

1. A multi-axis load cell comprising:
    a housing;
    a hub disposed in said housing;
    means for connecting said housing and said hub and for receiving and transmitting a load applied to said hub or said housing, said means including a plurality of one-piece flexures, each of the flexures having two ends, each end fixed to one of said housing and said hub, and each flexure has a medial portion coupled to the other of said housing and hub whereby a load applied to the hub or housing causes a displacement thereof by the movement of the connecting means, said displacement being related to the magnitude of the load applied; and
    means for measuring the relative displacement between said housing and said hub and generating signals corresponding thereto, said measuring means mounted to one of said housing and said hub and engaging the other of said housing and said hub, whereby the load exerted through said flexures may be determined, said measuring means including a first set of transducers arranged in pinwheel fashion about an axis of the load cell and a second set of transducers extending parallel to and about said load cell axis, all of said transducers in the first and second sets engaging the other of said hub and housing at points thereon in a substantially common plane.

2. A load cell of the type described in claim 1 wherein each flexure has three portions, including a medial portion for fixing a semi-circular portion mounted between hub and housing at the respective ends of the semi-circular portions.

3. A load cell of the type described in claim 1 wherein the connecting means consist of three one-piece flexures of similar size and shape, equally spaced one from another around the load cell axial axis.

4. A multi-axis load cell for sensing forces and moments applied thereon comprising:
a housing;
a hub having a least a portion disposed within the housing for receiving forces and moments; and
means for connecting the hub to the housing for relative movement therebetween to transmit forces and moments applied therebetween in all three orthogonal directions, said means including:
a plurality of flexible members extending between said housing and said hub, each of said flexible members fixed near its ends to one of said housing and said hub and coupled at a medial portion to the other of said housing and hub, each flexible member having first and second arcuate portions, one arcuate portion located between the one end and the medial portion and the other arcuate portion between the other end and the medial portion, said plurality of flexible members adapted to receive and transmit forces and moments in all three orthogonal directions; and
means for measuring movement between said housing and said hub and generating signals corresponding thereto as an indication of the forces and moments applied on the load cell, said measuring means coupled to at least one of said hub or housing.

5. A load cell of the type described in claim 4 wherein the medial portion of each flexible member is fixedly attached to the other of said housing and said hub.

6. A load cell of the type described in claim 4 wherein the arcuate portions of each flexible member are substantially circular segments.

7. A load cell of the type described in claim 6 wherein the circular segments are approximately semi-circles.

8. A multi-axis load cell of the type described in claim 4 where the measuring means comprises first and second sets of transducers, with said first set of transducers being mounted to said housing and disposed in pinwheel fashion about an axis of the hub and engaging the hub in a plane substantially perpendicular to the axis and the second set of transducers is disposed at spaced locations about the axis, said transducers and said engaging a portion carried on the hub in said first plane.

9. A multi-axis load cell of the type described in claim 8 wherein the transducers in said first and second sets are LVDT transducers for measuring the displacement of said hub.

10. A multi-axis load cell of the type described in claim 9 wherein the transducers in said second set are disposed substantially parallel to the axis.

11. A load cell of the type described in claim 4 wherein the arcuate portions of the flexible members have a substantially uniform height and a substantially uniform thickness throughout each arcuate portion.

12. A load cell of the type described in claim 11 wherein the ends of the flexible members have a larger height than the uniform height of each arcuate portion, said larger height for coupling the flexible member to the one of said hub and housing.

* * * * *